United States Patent [19]

Bolton et al.

[11] Patent Number: 4,857,087

[45] Date of Patent: Aug. 15, 1989

[54] DISK FILE EMPLOYING DUAL FILTERS

[75] Inventors: Ivor W. Bolton, Winchester; Richard N. Gibbons, Hamble; Gerald Dixon, Winchester, all of England

[73] Assignee: International Business Machines Corporation, Armonk, N.Y.

[21] Appl. No.: 120,889

[22] Filed: Nov. 16, 1987

[30] Foreign Application Priority Data

Mar. 6, 1987 [GB] United Kingdom ............... 8705274

[51] Int. Cl.⁴ .................. B01D 46/10; G11B 5/012
[52] U.S. Cl. .................................. 55/385.6; 55/482; 55/525; 55/DIG. 39; 360/98.01
[58] Field of Search ............ 55/385 E, 482, 523, 55/525, DIG. 39; 360/97-99; 211/40, 41

[56] References Cited

U.S. PATENT DOCUMENTS

| | | | |
|---|---|---|---|
| 2,973,833 | 3/1961 | Cook | 55/525 X |
| 3,731,291 | 5/1973 | Walsh | 360/98 |
| 4,054,931 | 10/1977 | Bolton et al. | 360/97 |
| 4,092,687 | 5/1978 | Butsch | 360/97 X |
| 4,268,878 | 5/1981 | Kearns | 360/97 |
| 4,282,554 | 8/1981 | Ho et al. | 360/97 |
| 4,329,722 | 5/1982 | West | 360/98 |
| 4,370,687 | 1/1983 | Shiraishi et al. | 360/98 |
| 4,410,341 | 11/1983 | Edwards et al. | 360/98 X |
| 4,412,261 | 10/1983 | Tateyama et al. | 360/98 |
| 4,418,369 | 11/1983 | Applequist et al. | 360/98 |
| 4,471,395 | 9/1984 | Beck et al. | 360/98 |
| 4,581,668 | 4/1986 | Campbell | 360/97 |
| 4,594,626 | 6/1986 | Frangesh | 360/97 |
| 4,684,510 | 8/1987 | Harkins | 360/97 X |
| 4,710,830 | 12/1987 | Imai et al. | 360/98 X |
| 4,780,872 | 12/1973 | Pall | 55/525 X |

FOREIGN PATENT DOCUMENTS

| | | | |
|---|---|---|---|
| 4214 | 1/1977 | Japan | 360/97 |
| 198485 | 9/1986 | Japan | 360/98 |
| 2043986 | 10/1980 | United Kingdom . | |
| 2076208 | 11/1981 | United Kingdom . | |

OTHER PUBLICATIONS

IBM Technical Disclosure Bulletin, vol. 24, No. 6, Nov. 1981, I. W. Bolton, "Filtration System for Disk File", (2 pages).

IBM Technical Disclosure Bulletin, vol. 27, No. 10A, Mar. 1985, "Auxiliary Internal Recirculating Airflow System", (2 pages).

Primary Examiner—Robert Spitzer
Attorney, Agent, or Firm—Robert W. Lahtinen

[57] ABSTRACT

A disk file 10 employs at least two filters 15,16 for removal of airborne particles, one filter 16 having a relatively coarse mesh and a relatively high rate of airflow and the other 15 having a relatively fine mesh and a relatively low rate of airflow. The fine filter 15 may be combined with a third, breather filter 30 which removes particles from air entering the disk enclosure. The main purpose of the coarse filter 16 is to remove the larger, more damaging particles very rapidly, thereby reducing the risk of damage to the surfaces of the disks 12.

9 Claims, 5 Drawing Sheets

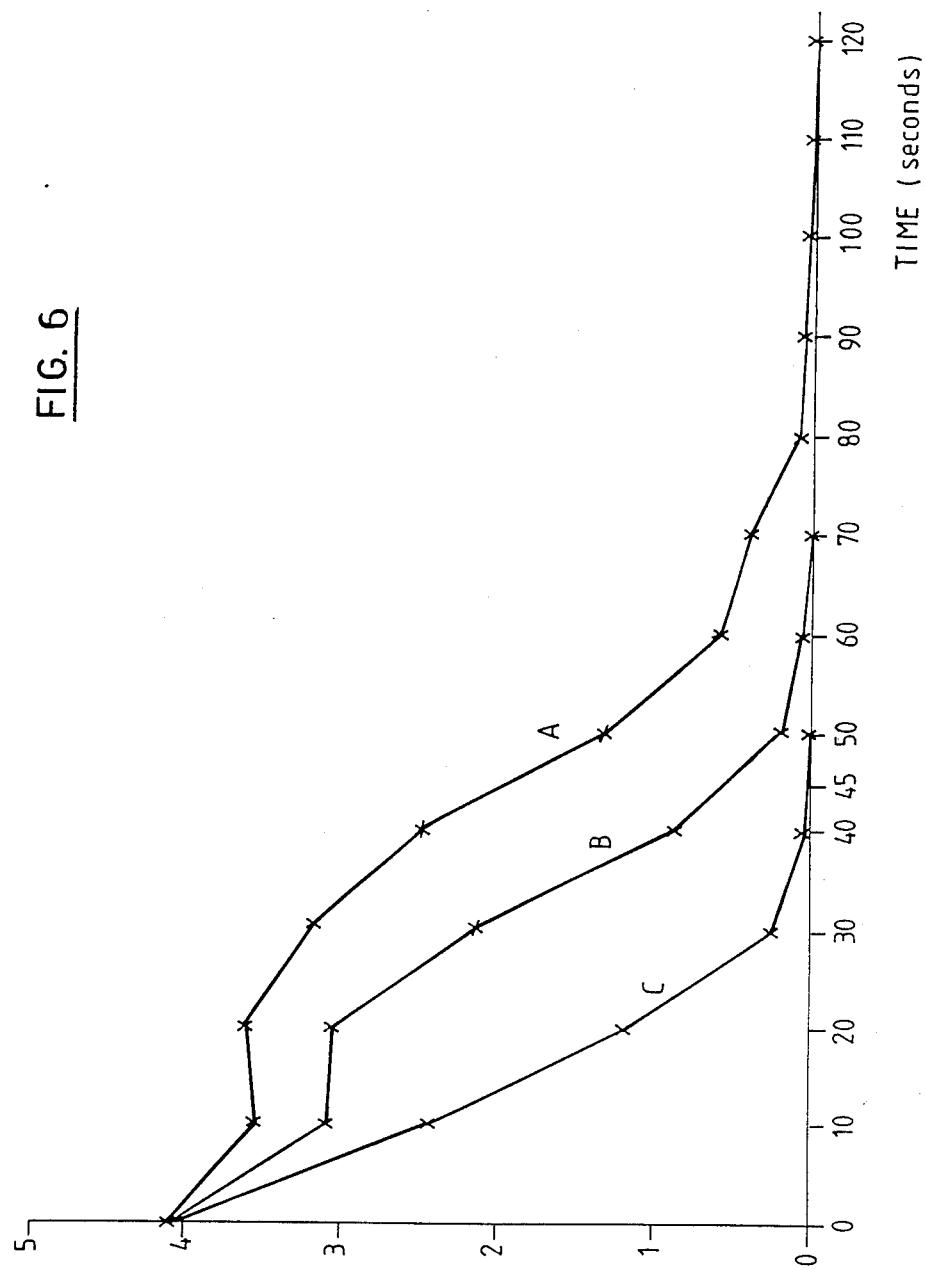

DISK FILE EMPLOYING DUAL FILTERS

DESCRIPTION

INTRODUCTION

This invention relates to a disk file employing dual filters for removing airborne contamination from a disk enclosure forming part of the disk file.

BACKGROUND ART

Magnetic disk files of the high performance type in which one or more magnetic heads are positioned over rapidly-rotating magnetic disks are very sensitive to the presence of solid particles in the area of the disks and particularly in the regions between the disks and the heads. In operation, each head flies a small distance above the surface of the disk and any particle entering the region between a head and a disk can cause damage to the disk. Further, relatively large airborne particles have been found to damage the surface of a disk without involving the head in any way; this damage is caused by the particle striking the surface of the rapidly-moving disk at a shallow angle, thereby ploughing a short furrow in the disk before either bouncing off the disk surface or becoming embedded in the disk surface. There is therefore a requirement for a filtration system to remove as many of these contamination particles as possible.

Prior art disk file filtration systems include that disclosed in GB 2,043,986. This provides a planar filter disposed over a metal plate and arranged such that the variations in air pressure caused by the moving disk generate air flow through the filter. This flow of air through the filter causes airborne particles to be caught and retained in the filter, preventing them subsequently causing any damage to the disk.

Another disk file filtration means is disclosed in IBM Technical Disclosure Bulletin Vol. 24 No. 6 November 1981 p. 2837. This discloses a filter disposed beneath the disk surface which again relies on disk movement to generate air flow through it. Also disclosed are two techniques for increasing the rate of air flow through the filter, the first being baffles to deflect air towards the inlets to the filter and the second being a baffle to reduce the air pressure at the outlets from the filter.

GB 2,076,208 discloses a combination filter assembly for a disk drive wherein one section of the filter is arranged to remove particulate contamination from a recirculating airflow within the disk enclosure (DE) and another section of the filter is arranged to remove particulate contaminants which are borne by air entering the DE through a breather hole in the DE casing.

IBM Technical Disclosure Bulletin Vol. 27 No. 10A March 1985 p. 5587 discloses an auxiliary filter positioned alongside a disk stack and incorporating a shroud for gathering air from a wide angle as it comes off the disks. This air is filtered and then directed towards the servohead so that this head is always operating in a freshly-filtered air flow.

SUMMARY OF THE INVENTION

The above discussed prior art techniques have been found not to remove relatively large particles sufficiently quickly to prevent serious damage. It has also been found that a significant number of new disk files are damaged when they are operated for the first time by large particles remaining from the manufacturing operations. Such particles are the most destructive and, ideally, should be removed, on start-up, before the disk reaches its full operating speed.

Accordingly, the present invention provides a disk file comprising an enclosure for enclosing a rotatably mounted stack of disks, means for rotating the stack past magnetic heads for reading information from and/or writing information to the disks during rotation thereof, such rotation causing airflow within the enclosure and air filter means located within the enclosure for removing particulate contamination, characterised in that the air filter means comprises a first relatively coarse filter whereby, in operation, relatively large particles are trapped and a second relatively fine filter whereby, in operation, relatively fine particles are trapped.

This invention solves the conflict which otherwise arises between the requirement to obtain a high air flow rate and the requirement eventually to remove all particulate contamination which may cause damage to the disk necessitating a filter with a relatively fine mesh.

Preferably the coarse and fine filters are located in substantially independent airflow paths.

This provides the advantage that the inclusion of the second filter does not increase the resistance to airflow provided by the filters.

Preferably, the first and second filters are arranged such that, in operation, the volume rate of airflow through said first relatively coarse filter is higher than the volume rate of airflow through said second relatively fine filter.

This provides the advantage that the filter system is particularly effective at trapping relatively large particles quickly. This is desirable since it is these large particles which are most destructive in a disk file environment. If possible, it is desirable to remove these large particles, on start-up, before the disk reaches its full operating speed.

Preferably, a scoop is provided adjacent the first relatively coarse filter to increase the volume rate of airflow, in operation, through said relatively coarse filter.

This increased airflow provides for more rapid removal of relatively larger particles and thereby further improves the performance of the filter. It also provides a higher velocity of airflow through the coarse filter; this increased velocity has been found to increase the efficiency with which the coarse filter traps fine particles.

Preferably, the first relatively coarse filter is disposed peripherally of the disks and the second relatively fine filter is disposed adjacent a surface of one of the disks.

This disposition of the coarse filter can help to provide a high airflow through the coarse filter since, in operation, the air in this area is likely to be moving at a high velocity due to having recently been close to the rapidly-moving surface of a disk.

Preferably, the inlet region of the scoop is arranged primarily alongside the stack of disks and has a localised extension to overlap the periphery of the stack of disks. This increases the size of the inlet region of the scoop over that otherwise obtainable and consequently increases the airflow through the coarse filter.

Preferably, the first relatively coarse filter has an average mesh spacing greater than 20 $\mu$m and the second relatively fine filter has an average mesh spacing less than 20 $\mu$m.

Experimental results have shown that the relatively large particles (which are most likely to cause damage)

are greater than 20 μm in size and that it is therefore most important to remove particles of this size rapidly.

Preferably, the material of the first relatively coarse filter is formed of a wire mesh which may be sintered, whereby wires which are in mutual contact are bonded together.

Preferably, the disk file comprises a third filter arranged to remove particles from air entering the disk enclosure through a breather aperture in said enclosure.

This is desirable since air entering the DE may well carry particulate contamination and it is beneficial to remove it at the point of entry to the DE, rather than permitting it to enter the DE and perhaps cause damage before it is trapped in a filter.

INTRODUCTION TO THE DRAWINGS

FIG. 6 is a schematic graph illustrating the rate of reduction of particle density with time in disk files employing the present invention in comparison with a prior art disk file.

DETAILED DESCRIPTION OF THE INVENTION

Figure 1:
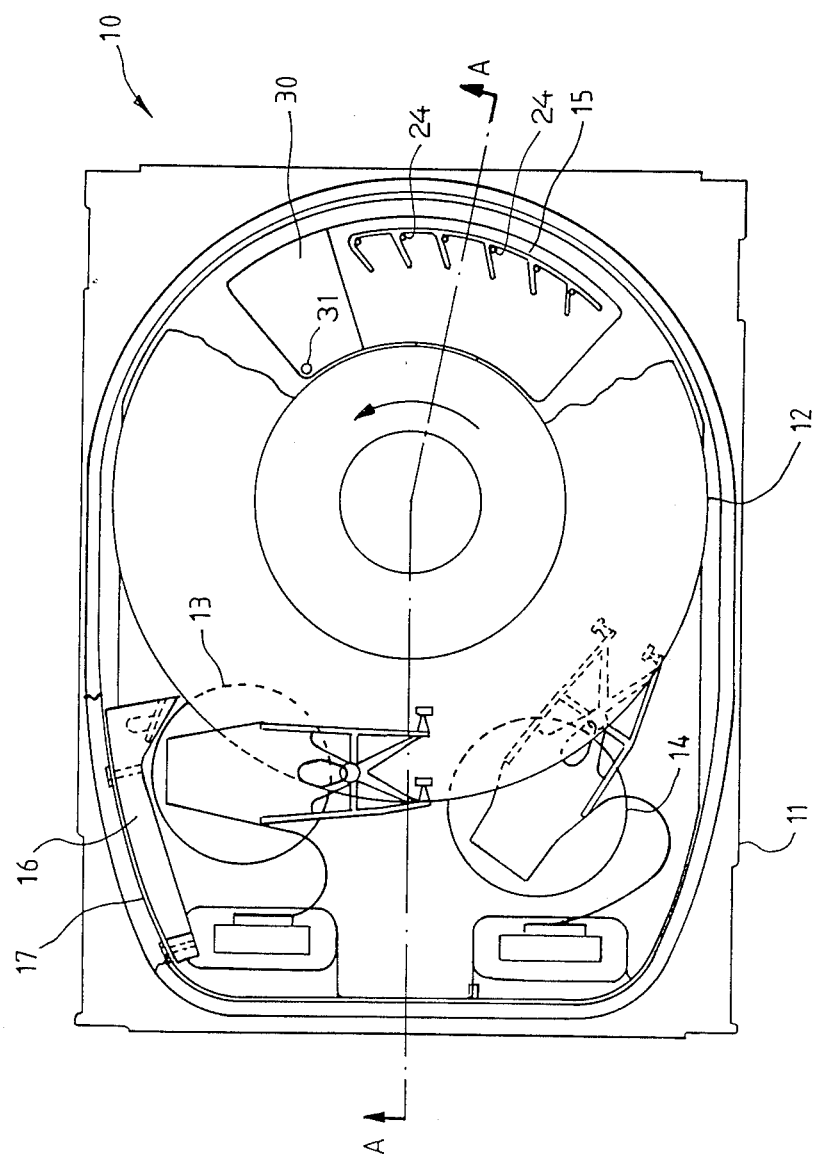
FIG. 1 is a plan view of a disk file according to the present invention, with most of its cover removed.

Referring to FIG. 1, the disk file 10 includes base plate 11, disk stack 12, rotary head positioning actuators 13, 14, fine filters 15, 30 positioned between the disk stack and the base plate and coarse filter 16 positioned alongside the disk stack. As can be seen from FIG. 2, these components are covered by cover 17 which is sealed to the base plate 11 by seal 18 to form an enclosure surrounding the disk stack 12 and actuators 13, 14. The disk stack 12 is supported by hub 19, rotatably mounted in bearings 20.

Figure 2:
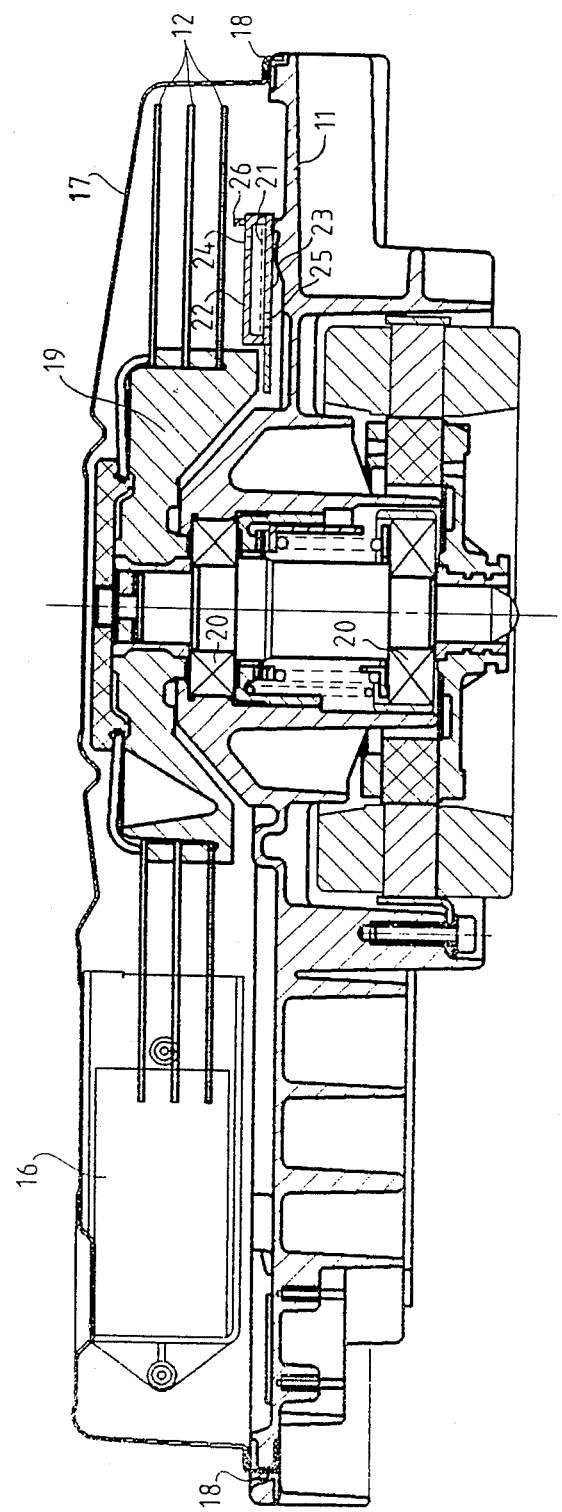
FIG. 2 is a cross-sectional view of an elevation of the disk file of FIG. 1 taken on the line AA. Details of the head-arm assembly and actuator have been omitted for clarity.
Figure 4:
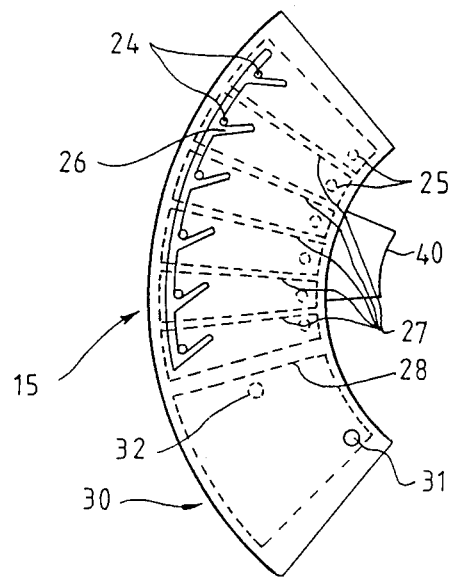
FIG. 4 is a plan view of a filter, additional to that shown in FIG. 3, also forming part of the disk file of FIG. 1.

Fine filter 15, shown in cross section in FIG. 2 and in plan view in FIG. 4, includes a filtration membrane 21, formed of layers of glass fibers, an upper cover 22, a lower cover 23 and holes in these covers, respectively 24 and 25. A baffle 26 is arranged near each hole 24. The filter is subdivided into 6 sections by internal barriers 27. This effectively produces 6 smaller filters but since they are all functionally equivalent they will be considered henceforth as one filter. Also included is a web 40 which, in combination with the base plate 11, directs air returning from the filter towards the disk hub. The function of this filter 15 is to remove particles from the air which is recirculating in the DE.

Figure 5:
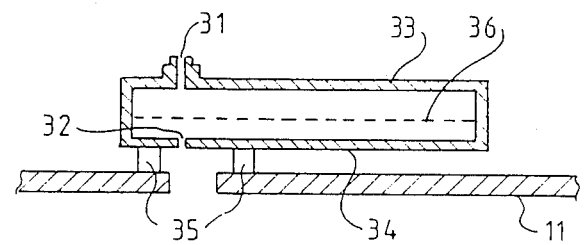
FIG. 5 is a cross-sectional view of an elevation of FIG. 4.

Also shown in FIG. 4 and further in FIG. 5 is fine filter 30 which functions as a breather filter. For economy this is manufactured as part of the moulding used for fine filter 15 but it is functionally separate. It includes an upper cover 33 and a lower cover 34, formed as extensions of upper cover 22 and lower cover 23 respectively, but the two filters are kept separate by internal barrier 28. This filter 30 includes a pipe 31 in the upper cover, communicating with the interior of the DE, and a hole 32 in the lower cover, communicating with the environment outside the DE and sealed from the DE by seal 35. This filter 30 is necessary to accommodate expansion and contraction of the air enclosed in the DE, caused by temperature changes produced by changes in the ambient temperature or by heat generated in the DE. The function of the seal 35 is to ensure that air which enters the DE through hole 32 must first pass through filter element 36, thereby reducing the risk of particulate contamination being introduced into the DE from outside.

Figure 3:
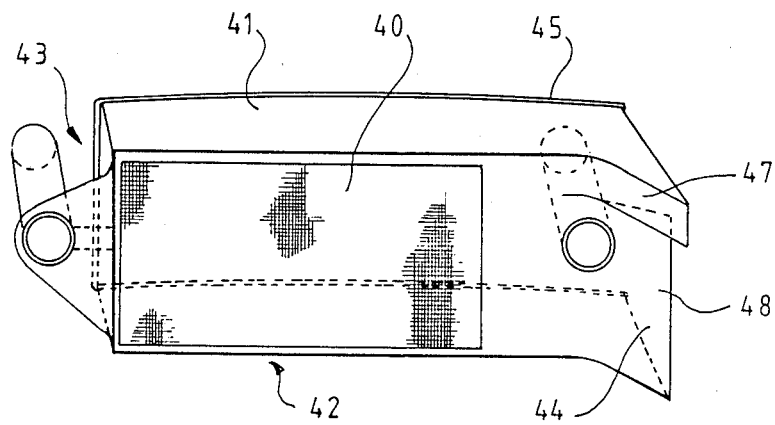
FIG. 3 is a perspective view of a filter forming part of the disk file of FIG. 1.

The coarse filter 16 is shown in plan view in FIG. 1, in elevation in FIG. 2 and in perspective in FIG. 3. It includes the filter element 40, upper panel 41, lower panel 42 and end panel 43. A scoop 44 is also provided. The filter is screwed onto the cover 17, which forms a panel roughly parallel to the filter element 40, and the junction between the panels 41, 42, 43 and the cover 17 is sealed by seal 45. Thus air entering the scoop 44 can only leave by passing through the filter element 40. The scoop is in 2 sections, 47 and 48. Section 48 does not extend as far into the DE as section 47. This is necessary to permit the arm of actuator 13 (shown schematically in FIG. 1) sufficient freedom to access the entire disk surface.

In operation, the disks rotate, generating a pumping effect which produces a relatively low air pressure near their hub and a relatively high air pressure near their peripheries. This provides the pressure difference across filter 15 to force air through it, since the pressure at holes 24 is higher than the pressure at holes 25. The airflow through this filter is further assisted by the baffles 26 which help to direct the airflow into the holes 24.

Pipe 31, connecting the DE to filter 30, is positioned, as shown by FIGS. 1 and 4, near the edge of filter 30 which is closest to the hub in which are mounted the disks 12. This hole is therefore positioned in an area of fairly low air pressure in the DE. The airflow through filter 30 will, in general, be low (since filter 30 provides the only air path of any substantial size between the DE and the external environment) so the pressure at hole 31 will be approximately atmospheric pressure. Since hole 31 is in a low pressure area in the DE, it follows that most of the DE will be at a pressure above that of the external atmosphere. This is desirable since any leakage routes which exist between the DE and the outside (other than through filter 30) will then pass air from the DE to the outside (rather than vice versa), so reducing the risk of contaminants entering the DE through these leakage routes. This effect is increased by air flowing across the open end of pipe 31, as a result of the pumping action of the disks, which sucks air out of the pipe 31 into the DE, so further increasing the internal DE pressure relative to the external atmospheric pressure.

Filter 16 is positioned alongside the disk stack with scoop 44 directed towards the stack, so that the filter will receive a large airflow through it. This is desirable if it is to achieve the desired result of removing any relatively large particulate material quickly on start-up.

FIG. 6 is a schematic graph illustrating improvements in experimental results achieved employing the present invention. It shows how the particle density (in particles per cubic centimeter) measured at a point in space in the DE varies with time, starting at the point of application of power to the motor driving the disk stack. Line A represents results achieved by employing only the fine filters 15 and 30 while lines B and C represent results achieved with all three filters 15, 30 and 16 employed, the only difference in apparatus and technique between B and C being that line B was generated using a sintered wire mesh filter material know as "Rigimesh R" ("Rigimesh" is a registered trade mark of PAL Process Filtration Ltd.) as the filter element 40 in coarse filter 16 whereas line C was generated using a different fibrous filter material known as "Filtrete" as the element 40 "Filtrete" is a registered trade mark of the Minnesota Mining and Manufacturing Company).

The particles used for the experiment varied from 0.5 μm upwards. At time=0, the particle density is the same for all three lines and it can be seen that the use of the coarse filter 16 with either filter material increases the rate at which particles are removed from the DE. The full extent of the benefit provided by this invention is not apparent until it is considered that the disk stack does not reach its full operating speed until 45 seconds from the application of power. It can be seen from FIG. 6 that lines B and C are very much lower than line A at this point and that, therefore, substantially less disk damage can occur.

Further, since the particles used varied from only 0.5 μm upwards, and the coarse filter is most effective at trapping particles above 20 μm or so, it is reasonable to assume that the particles remaining when the particle density is below 1 on lines B and C are concentrated at the lower end of the size spectrum of those injected initially and will hence be less damaging. This is not the case for line A since the filters present in this case trap all particles present with similar effectiveness.

In tests it has been found that the coarse filter materials used ("Rigimesh R" and "Filtrete") are, surprisingly, capable of trapping significant quantities of particles which are well below the average mesh spacing of the filter material concerned. This means that it is possible to use only one filter comprising a coarser filter material than has been used before for filtering particles in a disk drive. This would provide the benefit that the airflow through the filter would be increased, for a given design of filter housing and disk drive, over that otherwise available so that the particulate contamination, and in particular the larger particles, would be removed from the DE more quickly.

"Rigimesh" is a product of PAL Process Technology Ltd. and is formed from a wire mesh in which the wires have been bonded to each other by a sintering process. It is available in various average mesh spacings; the grade most suitable for this application (grade R) has nominally 50 μm holes and 25 μm diameter wires, giving an overall repeat distance of 75 μm.

"Filtrete" is a fibrous filtration membrane manufactured by the Minnesota Mining and Manufacturing Company and is available in various thicknesses, all of a similar fiber size and spacing but varying in the volume of particulate material they can absorb per unit area and in the resistance to airflow they present.

The media is a non-woven, cloth like fiber material that attracts particles by an electrostatic attraction that is a property of the molecular structure of the material such that the electrostatic activity is not lost by such factors as aging, washing or vibration. The filtering action is not due to the size of openings in the material and accordingly, the filter media can be effective with reduced obstruction to air flow.

We claim:

1. A disk file including an enclosure for enclosing a stack of disks,
    means for rotatably mounting the disk stack for rotation past magnetic heads mounted within the enclosure for reading information from and/or writing information on the disks during rotation thereof, such rotation causing air flow within the enclosure; and
    air filter means located within the enclosure for removing particulate contamination borne by air circulating within the enclosure in which:
    the air filter means comprises a first relatively coarse recirculating filter for trapping relatively large particles and a second relatively fine recirculating filter capable of trapping relatively fine particles.
    said coarse and fine filters being located in substantially independent air flow paths.

2. A disk file as claimed in claim 1 in which the first and second filters are arranged such that, in operation, the volume rate of airflow through said first relatively coarse filter is higher than the volume rate of airflow through said second relatively fine filter.

3. A disk file as claimed in claim 1 in which a scoop is provided adjacent the first relatively coarse filter to increase the volume rate of airflow, in operation, through said relatively coarse filter.

4. A disk file as claimed in claim 3 in which the first relatively coarse filter is disposed peripherally of the disks and the second relatively fine filter is disposed adjacent a surface of one of the disks.

5. A disk file as claimed in claim 4 in which the disk stack has a periphery at the outer diameter of said disks and the scoop adjacent said coarse filter has an inlet region arranged primarily alongside the stack of disks and has a localized extension to overlap the periphery of the stack of disks.

6. A disk file as claimed in claim 1 in which the first relatively coarse filter has an average mesh spacing greater than 20 μm and the second relatively fine filter has an average mesh spacing less than 20 μm.

7. A disk file as claimed in claim 6 in which the material of the first relatively coarse filter is formed of a wire mesh.

8. A disk file as claimed in claim 7 in which the wire mesh has been sintered, whereby wires which are in mutual contact are bonded together.

9. A disk file as claimed in claim 1 comprising a third filter arranged to remove particles from air entering the disk enclosure through a breather aperture in said enclosure.

* * * * *